United States Patent

Ozawa et al.

[11] Patent Number: 6,024,820
[45] Date of Patent: Feb. 15, 2000

[54] MOLD-CHANGING DEVICE IN AN ORNAMENTAL BODY GLUING APPARATUS

[75] Inventors: Fukuji Ozawa, Okazaki; Hitoshi Yamashita; Tetsu Yabuno, both of Toyokawa, all of Japan

[73] Assignee: Sintokogio, Ltd., Nagoya, Japan

[21] Appl. No.: 09/070,161

[22] Filed: Apr. 30, 1998

Related U.S. Application Data

[63] Continuation-in-part of application No. 08/709,995, Sep. 9, 1996, abandoned.

[30]      Foreign Application Priority Data

Sep. 8, 1995 [JP] Japan .................................. 7-257108

[51] Int. Cl.⁷ .............................. B32B 31/00; B30B 15/00
[52] U.S. Cl. ........................... 156/212; 156/475; 156/556; 425/383; 425/500; 425/518
[58] Field of Search ..................... 156/212, 475, 156/556; 425/383, 518, 500

[56]           References Cited

U.S. PATENT DOCUMENTS 1,126,954  2/1915  Burroughs et al. .................... 425/346
4,944,669  7/1990  Zakich .................................... 425/589

FOREIGN PATENT DOCUMENTS 4-105938  4/1992  Japan .
6-36407   5/1994  Japan .

*Primary Examiner*—Richard Crispino
*Assistant Examiner*—Linda L Gray
*Attorney, Agent, or Firm*—Limbach & Limbach L.L.P.

[57]            ABSTRACT

A device used for an ornamental body gluing apparatus is disclosed to reduce the work and time necessary to change molds. The device includes a cylinder mounted on a press-gluing station, the cylinder having an attaching plate to which a receiving plate is detachably attached; receiving-plate-holding bushes attached to the lower surface of the receiving plate; receiving-plate-holding cylinders mounted on the cope for engaging the receiving-plate-holding bushes; positioning bushes disposed on the upper surface of a drag; positioning pins disposed on a cope for engaging the positioning bushes; positioning bushes disposed on the upper surface of the cope; and positioning pins suspended from the bottom of the groove-fitting mold for engaging the positioning bushes disposed on the upper surface of the cope.

2 Claims, 3 Drawing Sheets

MOLD-CHANGING DEVICE IN AN ORNAMENTAL BODY GLUING APPARATUS

CROSS-REFERENCE TO RELATED APPLICATION

This is a continuation-in-part of application Ser. No. 08/709,995, filed Sep. 9, 1996 now abandoned.

FIELD OF THE INVENTION

This invention relates to an apparatus that glues a sheet of cloth, bonded fabric, or carpet, on a formed base body, and in particular to a mold-changing device in this sheet-gluing apparatus.

DESCRIPTION OF THE PRIOR ART

Generally the operation to glue an ornamental body such as a cloth etc. on a formed base body, as of a door trim for an automobile, is carried out by an ornamental-body gluing apparatus as in FIG. 1. The apparatus includes a press-gluing station A where an ornamental body is pressed and glued against a formed base body and then trimmed, and a groove-fitting station B where the edge of the trimmed ornamental body is inserted into a groove formed in the formed base body. The press-gluing station A includes a receiving plate 6, which holds an ornamental body before it is glued on a formed base body, and a cope 7 comprised of a press mold 7A and a trimming edge. The groove-fitting station B includes a groove-fitting mold comprised of a groove-fitting edge 13A that inserts the outer edge of an ornamental body into a groove formed in the base body. The apparatus also includes a truck 3, and a drag 5, which is carried by the truck between station A and station B.

When the product to be produced is changed, for example, from a trim for a right door to one for a left door, the receiving plate, cope, drag, and groove-fitting mold of the trim for the right door must be changed to those for the left door. Conventionally, the mold-changing operation has been carried out as below. First the drag and cope are fitted together and then removed from the apparatus to the back of the press-gluing station. Then, the groove-fitting mold is discharged to the back of the groove-fitting station, and the receiving plate is discharged to the front of the press-gluing station. Thus each mold or element is separately discharged, and new molds and the other elements are also separately mounted on the apparatus.

This operation requires a lot of work and time. Especially, when molds are changed many times a day, the changes cause a disadvantage in that they reduce production efficiency.

The present invention is conceived to resolve this disadvantage. Its purpose is to reduce the work and time necessary to change the molds, and thereby to help enhance production efficiency.

SUMMARY OF THE INVENTION

To the above end, the mold-changing device of the present invention used for an ornamental-body gluing apparatus has a press-gluing station, a groove-fitting station, and a truck to run between the press-gluing station and groove-fitting station to carry a drag detachably attached to the upper surface of the truck. The press-gluing station includes a receiving plate and a cope disposed above the receiving plate, the receiving plate having a central opening through which a press mold portion of the cope passes and having a clamp device disposed around the central opening for holding an ornamental body, the cope being detachably attached to the press-gluing station such that the cope vertically moves, the cope being adapted to glue and cut an ornamental body on a formed base body. The groove-fitting station includes a groove-fitting mold detachably attached to the groove-fitting station such that the groove-fitting mold moves vertically, the groove-fitting mold being adapted to insert the edge of the glued ornamental body into a groove of the formed base body. The device includes a cylinder mounted on the press-gluing station, the cylinder having an attaching plate to which the receiving plate is detachably attached; receiving-plate-holding bushes attached to the lower surface of the receiving plate; receiving-plate-holding cylinders mounted on the cope for engaging the receiving-plate-holding bushes; positioning bushes disposed on the upper surface of the drag; positioning pins disposed on the cope for engaging the positioning bushes; positioning bushes disposed on the upper surface of the cope; and positioning pins suspended from the bottom of the groove-fitting mold for engaging the positioning bushes disposed on the upper surface of the cope.

DESCRIPTION OF THE PREFERRED EMBODIMENT

Figure 1:
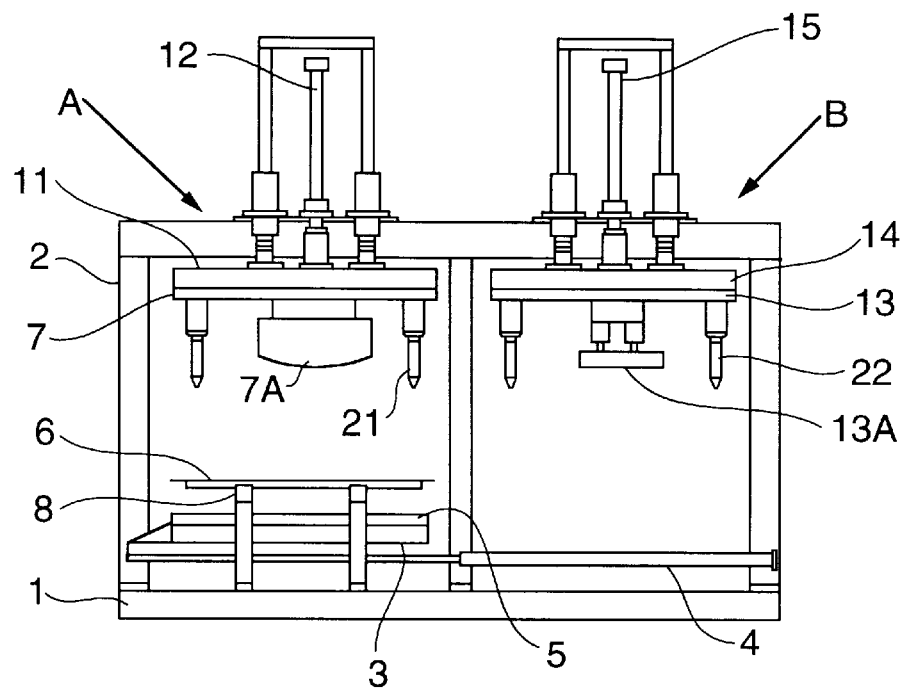
FIG. 1 is a front view of the embodiment of a prior art ornamental-body gluing apparatus relating to the present invention.

The preferred embodiment will now be explained in detail by reference to the accompanying drawings. FIG. 1 is a schematic drawing of an apparatus to glue an ornamental body on a formed base body. Number 1 denotes a base frame on which a upright double housing frame 2 is mounted. Number 3 denotes a truck, which is actuated by a cylinder 4 to run between the press-gluing station A and groove-fitting station B. A drag 5, which supports a formed base body, is detachably clamped on the upper surface of the truck 3. Number 6 denotes a receiving plate to hold an ornamental body which is glued on the formed base body. The receiving plate 6 has at the central part an opening, which a press mold 7A of a cope 7 (below explained) penetrates, and at the periphery of the opening a clamp device (see JP-U [Japanese Utility Model Application KOKAI] 6-36407) to hold the ornamental body. As in FIGS. 2 and 3, the receiving plate 6 is detachably attached to a receiving-plate-attaching plate 9 by means of rotary clamps 10. The cope 7 is detachably attached to an upper table 11 of the press-gluing station A by means of clamps (not shown). The upper table 11 is moved by a cylinder 12 mounted on the ceiling of the double housing frame 2. Number 13 denotes a groove-fitting mold having a groove-fitting edge 13A. The groove-fitting mold 13 is detachably attached to an upper table 14 of the groove-fitting station B by means of clamps (not shown). The upper table 14 is vertically moved by a cylinder 15 mounted on the ceiling of the double housing frame 2.

Figure 5:
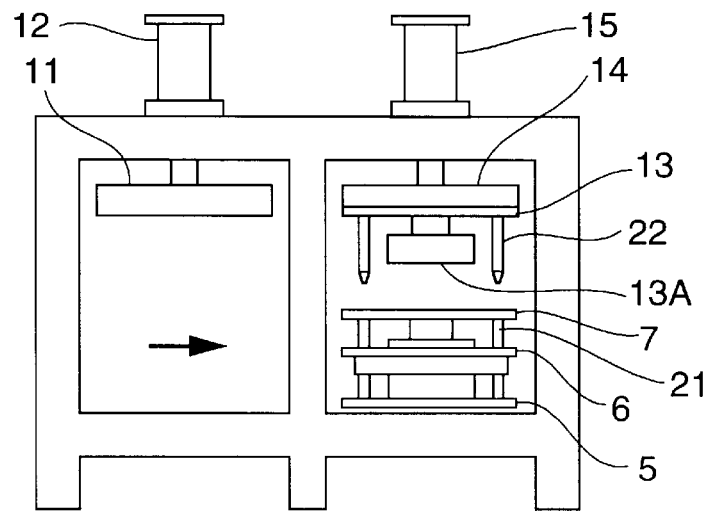
FIG. 5 is a front view of the apparatus of FIG. 1, where the molds have been removed halfway according to the present invention.
Figure 6:
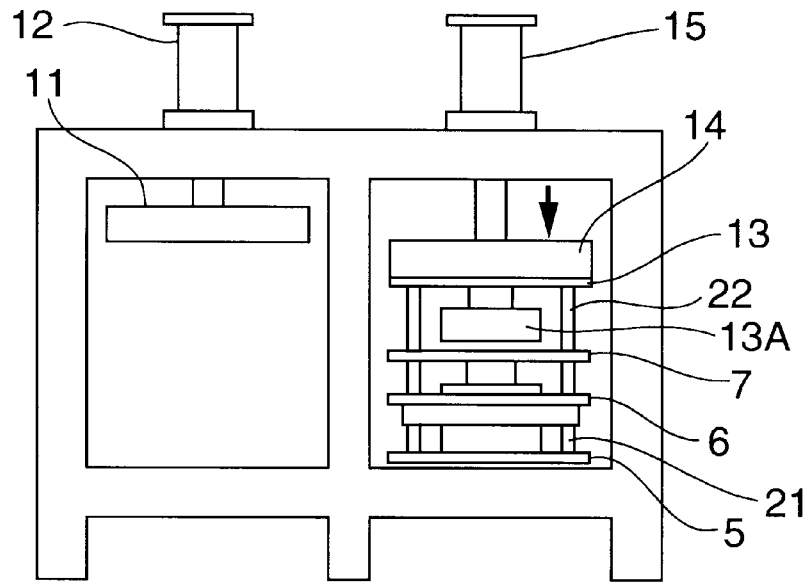
FIG. 6 is also a front view of the apparatus of FIG. 1, where the molds have been removed halfway according to the present invention.
Figure 7:
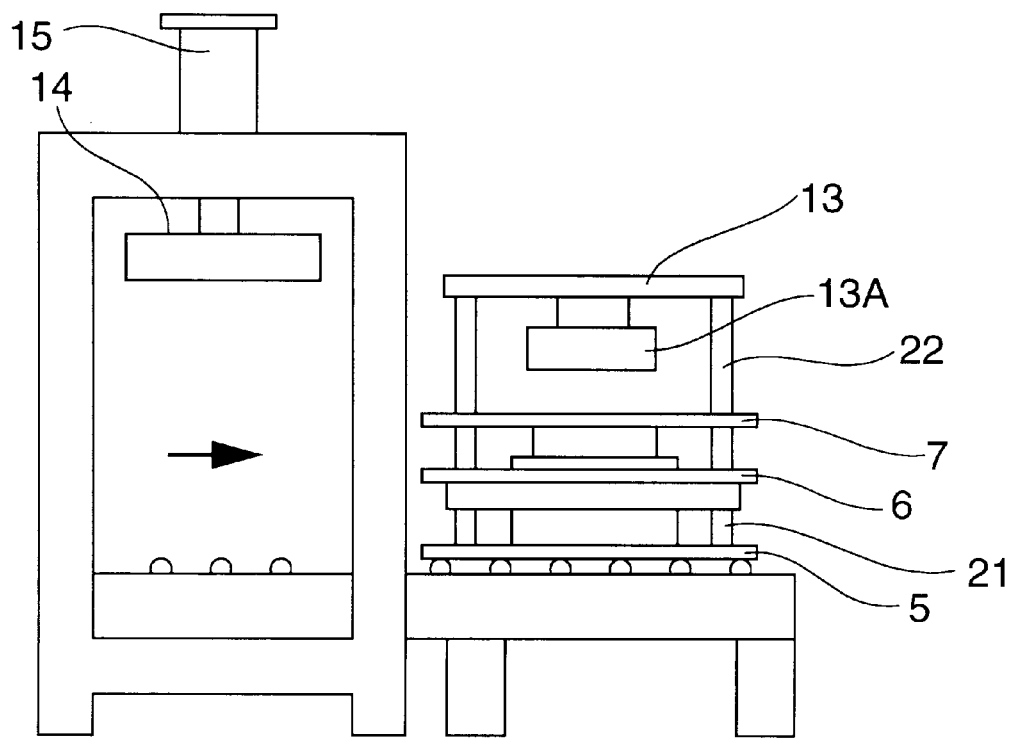
FIG. 7 is a side view of the apparatus of FIG. 1, where the molds have been totally removed according to the present invention.

The operation of attaching an ornamental body to a base body is performed as follows: with receiving plate 6 in station A, a clamp (not shown in the Figures) mounted on plate 6 (and movable with respect to plate 6) holds the edge of the ornamental body to plate 6. There is adhesive on the bottom surface of the ornamental body. Cope 7 is then lowered so that portion 7A of cope 7 presses the adhesive-bearing surface of the ornamental body against the base body on drag 5, thereby gluing the ornamental body to the base body. Then, cope 7 is raised, and the base body, ornamental body, and drag 5 are moved to station B by means of cylinder 4. At station B, edge 13A of mold 13 is lowered into a groove in the base body (so that edge 13A presses the edge of the ornamental body against the groove). In contrast, when drag 5, plate 6, cope 7, and mold 13 are to be replaced by new molds and plates (at a time when no base body or ornamental body is present in station A or B), plate 6, drag 5, and cope 7 are fitted together as described below. Plate 6, drag 5, and cope 7 are then moved together as a unit to station B by means of cylinder 4 (to the position shown in FIG. 5). Then, at station B, mold 13 is lowered onto cope 7, as shown in FIG. 6. Then, mold 13, plate 6, drag 5, and cope 7 are moved together as a unit out of station B (as shown in FIG. 7).

Figure 2:
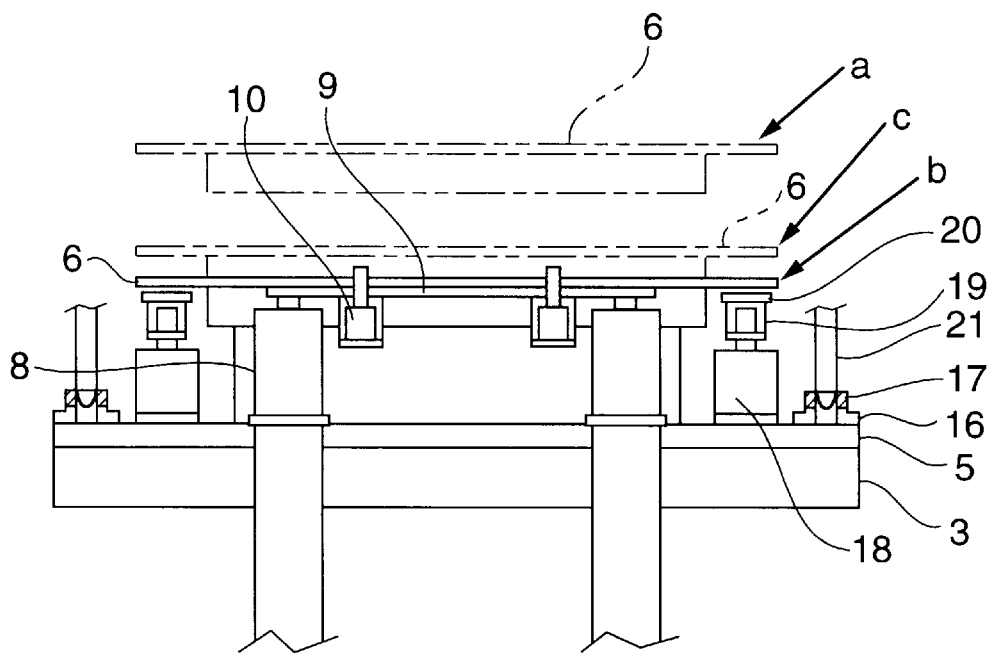
FIG. 2 is a partial front view of FIG. 1, taken near a receiving plate of the press-gluing station of the apparatus according to the present invention.
Figure 3:
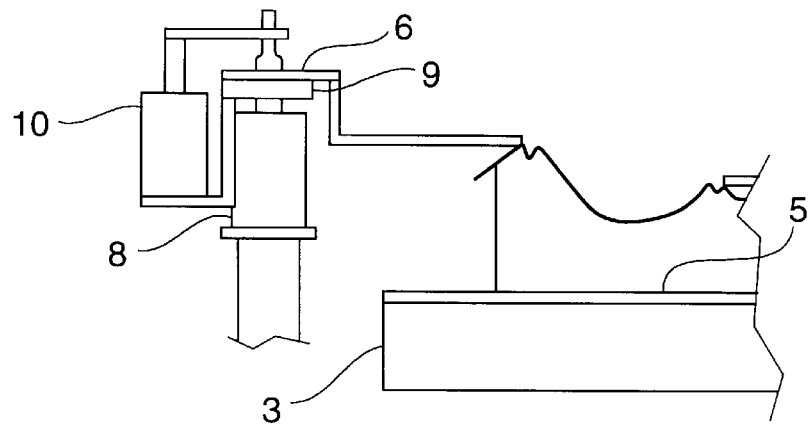
FIG. 3 is a side view of the attaching portion of the receiving plate.
Figure 4:
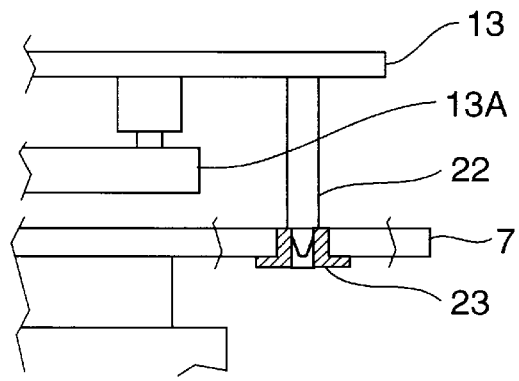
FIG. 4 is a cross-sectional view of the positioning pins of a groove-fitting mold and the positioning bushes of a cope wherein the pins engage the bushes.

Now the device to change the molds in the ornamental gluing apparatus will be explained. First, protecting bushes 17 are manually set on positioning bushes 16 of the drag 5 (FIG. 2). After this, the apparatus automatically operates when a push button of a control panel is pressed for removing molds. First the cylinder of a sheet-receiving device (not shown) is retracted to lower a sheet-receiving table (not shown). After the table is lowered, a clamp device disposed on the upper surface of the receiving plate 6 is closed, and the receiving plate 6 is lifted by the cylinder 8 to position "a" of FIG. 2. The truck 3, which carries the drag 5, moves to the press-gluing station A, and the receiving plate 6 is lowered by the cylinder 8 to position "b" of FIG. 2. Then, rotary clamps 10 (FIG. 3) that have clamped the receiving plate are unlocked. Receiving-plate-holding cylinders 18 are then actuated to lift the receiving plate, via receiving-plate-holding pins 19 and receiving-plate-holding bushes 20, to position "c" of FIG. 2, while a device (not shown) to prevent the cope from dropping is opened, so that the press-gluing cylinder 12 lowers the upper table 11 and cope 7 until the positioning pins 21 are fitted into the protecting bushes 17 and positioning bushes 16. Then all water and electrical connectors (none shown), which are connected to the cope 7, are disconnected, while clamps (not shown), which secure the cope 7 to the upper table 11, are opened. The upper table 11 is then lifted. Thus the cope 7 and drag 5 are fitted together via the receiving plate 6. The truck 3, which carries these molds 5, 7 and plate 6, is moved by the cylinder 4 from the press-gluing station A to the groove-fitting station B as in FIG. 5. After it moves, a device to prevent the groove-fitting mold from dropping (not shown) is opened, while the cylinder 15 is actuated to lower the upper table 14 as in FIG. 6 until positioning pins 22 are inserted into positioning bushes 23 mounted on the cope 7 as in FIG. 4. Then clamps (not shown), which secure the groove-fitting mold 13 to the upper table 14, are opened, and the upper table 14 is lifted. Thus the groove-fitting mold 13 is placed on the cope 7.

Then a stack of the drag 5, receiving plate 6, cope 7, and groove-fitting mold 13, is discharged from the back of the groove-fitting station B. A new set of molds and a plate are introduced from the back of the groove-fitting station B, and these components are attached in position in the apparatus in the reverse order. Thus the change of molds is completed.

In the mold-changing device of the present invention used for an ornamental-body gluing apparatus, since an assembly of the receiving plate, cope, drag, and groove-fitting mold is discharged from the back of the groove-fitting station, and a new assembly of them is introduced from the back of the groove-fitting station and attached in position, the work and time for changing these components is reduced. Thus this invention helps enhance productivity.

What we claim is:

1. A mold-changing device used for an apparatus that has a press-gluing station to which a vertically movable cope is detachably attached, a groove-fitting station to which a vertically movable groove-fitting mold is detachably attached, a receiving plate having an opening, a drag disposed under the receiving plate, and a truck to run horizontally between the press-gluing station and the groove-fitting station to carry the drag that is detachably attached to the truck, wherein the cope has a first and a second portion, the first portion being able to pass through the opening of the receiving plate, the receiving plate and the cope are configured to be supported on the drag so that the truck can carry an assembly comprising the drag, the receiving plate and the cope from the press-gluing station to the groove-fitting station, and the groove-fitting mold is configured to be lowered onto the assembly in said groove-fitting station, said mold-changing device comprising:

at least one first cylinder mounted on the press-gluing station for supporting and vertically moving the receiving plate;

bushes attached to the bottom of the receiving plate;

at least one second cylinder mounted on the drag for engaging said bushes to receive the receiving plate from said at least one first cylinder;

positioning bushes mounted on the drag;

positioning pins downwardly projecting from the bottom of the second portion of the cope for engaging said positioning bushes on the drag;

positioning bushes mounted on the cope; and positioning pins downwardly projecting from the groove-fitting mold for engaging said positioning bushes of the cope, wherein the at least one first cylinder and the at least one second cylinder are operable in a mold-changing mode to fit together the receiving plate, the drag, the groove-fitting mold, and the cope using the bushes attached to the receiving plate, the positioning bushes mounted on the drag, the positioning pins projecting from the second portion of the cope, the positioning bushes mounted on the cope, and the positioning pins projecting from the groove-fitting mold, so that the fitted-together receiving plate, drag, groove-fitting mold, and cope can be moved together as a unit on the truck out of the groove-fitting station.

2. A mold-changing device used for an apparatus that has a press-gluing station to which a vertically movable cope is detachably attached, a groove-fitting station to which a vertically movable groove-fitting mold is detachably attached, a receiving plate having an opening, a drag disposed under the receiving plate, and a truck to run horizontally between the press-gluing station and the groove-fitting station to carry the drag that is detachably attached to the truck, wherein the cope has a first and a second portion, the first portion being able to pass through the opening of the receiving plate, the receiving plate and the cope are configured to be supported on the drag so that the truck can carry an assembly comprising the drag, the receiving plate and the cope from the press-gluing station to the groove-fitting station, and the groove-fitting mold is configured to be lowered onto the assembly in said groove-fitting station, said mold-changing device comprising:

at least one first cylinder mounted on the press-gluing station for supporting and vertically moving the receiving plate;

bushes attached to the bottom of the receiving plate;

at least one second cylinder mounted on the drag for engaging said bushes to receive the receiving plate from said at least one first cylinder;

positioning bushes mounted on the drag;

positioning pins downwardly projecting from the bottom of the second portion of the cope for engaging said positioning bushes on the drag;

positioning bushes mounted on the cope; and positioning pins downwardly projecting from the groove-fitting mold for engaging said positioning bushes of the cope.

\* \* \* \* \*